United States Patent
Svedloff et al.

(10) Patent No.: US 10,162,906 B1
(45) Date of Patent: *Dec. 25, 2018

(54) METHOD AND APPARATUS FOR PROCESSING INFORMATION RELATED TO INTERACTIVE WEB SITES

(71) Applicant: Ariba, Inc., Sunnyvale, CA (US)

(72) Inventors: George Svedloff, Sunnyvale, CA (US); William Wong, San Bruno, CA (US)

(73) Assignee: SAP SE, Walldorf (DE)

( * ) Notice: Subject to any disclaimer, the term of this patent is extended or adjusted under 35 U.S.C. 154(b) by 883 days.

This patent is subject to a terminal disclaimer.

(21) Appl. No.: 14/309,801

(22) Filed: Jun. 19, 2014

Related U.S. Application Data

(63) Continuation of application No. 09/693,797, filed on Oct. 19, 2000, now Pat. No. 8,799,463.

(51) Int. Cl.
*G06F 17/30* (2006.01)
*G06F 3/0481* (2013.01)

(52) U.S. Cl.
CPC ...... *G06F 17/30893* (2013.01); *G06F 3/0481* (2013.01)

(58) Field of Classification Search
None
See application file for complete search history.

(56) References Cited

U.S. PATENT DOCUMENTS

| | | | |
|---|---|---|---|
| 5,805,889 A | 9/1998 | Van De Vanter | |
| 5,848,396 A * | 12/1998 | Gerace | G06Q 30/02 705/7.33 |
| 5,991,735 A * | 11/1999 | Gerace | G06Q 30/02 705/7.29 |
| 6,012,087 A * | 1/2000 | Freivald | G06F 17/3089 707/E17.116 |
| 6,038,548 A * | 3/2000 | Kamil | G06Q 30/02 705/35 |
| 6,081,835 A * | 6/2000 | Antcliff | G06F 17/30899 707/E17.119 |
| 6,085,193 A | 7/2000 | Malkin et al. | |
| 6,094,657 A | 7/2000 | Hailpern et al. | |
| 6,173,316 B1 | 1/2001 | De Boor et al. | |
| 6,233,584 B1 * | 5/2001 | Purcell | G06F 17/30545 705/28 |
| 6,286,046 B1 | 9/2001 | Bryant | |

(Continued)

*Primary Examiner* — Backhean Tiv
(74) *Attorney, Agent, or Firm* — Fountainhead Law Group P.C.

(57) ABSTRACT

A method for creating interactive web sites that are easy to modify is disclosed. The method uses a specific web server request handler system that examines each request to determine if a handler should be called to handle information related to the referring web page. Specifically, the server system examines the address of the referring web page to see if the server has a handler routine associated with the referring web page. If the server has a handler associated with the referring web page, then the server executes the handler routine to process any information in the current request, any state information, or any other information. After executing the handler routine, the server handles the current request. The handling of the current request may be affected by the processing performed by the handler routine associated with the referring web page.

21 Claims, 7 Drawing Sheets

(56) References Cited

U.S. PATENT DOCUMENTS

| | | | |
|---|---|---|---|
| 6,311,165 B1* | 10/2001 | Coutts | G06Q 20/1085 235/379 |
| 6,401,077 B1* | 6/2002 | Godden | G06Q 30/06 705/26.8 |
| 6,421,729 B1 | 7/2002 | Paltenghe et al. | |
| 6,448,979 B1 | 9/2002 | Schena et al. | |
| 6,460,038 B1 | 10/2002 | Khan et al. | |
| 6,470,386 B1* | 10/2002 | Combar | G06F 11/0709 705/40 |
| 6,473,740 B2 | 10/2002 | Cockrill et al. | |
| 6,477,578 B1* | 11/2002 | Mhoon | G06Q 20/02 705/38 |
| 6,484,149 B1* | 11/2002 | Jammes | G06F 17/3089 705/26.62 |
| 6,496,931 B1 | 12/2002 | Rajchel et al. | |
| 6,560,655 B1* | 5/2003 | Grambihler | H04L 67/10 709/202 |
| 6,563,800 B1 | 5/2003 | Salo et al. | |
| 6,587,866 B1 | 7/2003 | Modi et al. | |
| 6,594,692 B1 | 7/2003 | Reisman | |
| 6,609,198 B1 | 8/2003 | Wood et al. | |
| 6,628,766 B1* | 9/2003 | Hollis | H04M 15/00 379/114.2 |
| 6,668,322 B1 | 12/2003 | Wood et al. | |
| 6,691,232 B1 | 2/2004 | Wood et al. | |
| 6,874,084 B1* | 3/2005 | Dobner | H04L 63/0281 709/223 |
| 6,892,307 B1 | 5/2005 | Wood et al. | |
| 6,941,351 B2 | 9/2005 | Vetrivelkumaran et al. | |
| 7,000,242 B1* | 2/2006 | Haber | G06F 17/30274 725/43 |
| 7,013,329 B1 | 3/2006 | Paul et al. | |
| 7,089,560 B1* | 8/2006 | Uhler | G06F 9/465 709/201 |
| 7,107,548 B2* | 9/2006 | Shafron | G06F 17/30899 715/826 |
| 7,194,757 B1* | 3/2007 | Fish | G06Q 10/10 348/E7.07 |
| 7,197,475 B1* | 3/2007 | Lorenzen | G06Q 30/02 235/383 |
| 7,333,944 B1* | 2/2008 | Harris | G06Q 30/00 705/26.43 |
| 7,383,299 B1* | 6/2008 | Hailpern | G06F 17/30867 707/999.004 |
| 7,634,428 B1* | 12/2009 | Varatharajah | G06Q 20/20 235/375 |
| 7,664,678 B1* | 2/2010 | Haber | G06F 17/30274 705/26.9 |
| 7,778,934 B2* | 8/2010 | Graves | G06Q 20/02 235/382 |
| 8,280,779 B2* | 10/2012 | Davis | G06Q 30/00 705/26.1 |
| 8,312,168 B2* | 11/2012 | Rhoads | G06F 17/30047 370/454 |
| 8,799,463 B1* | 8/2014 | Svedloff | H04L 67/02 709/225 |
| 2001/0032090 A1* | 10/2001 | Moneim | G06F 17/243 705/25 |
| 2002/0016813 A1* | 2/2002 | Woods | G06F 9/542 718/107 |
| 2002/0049774 A1* | 4/2002 | Ritzel | G06Q 10/06 |
| 2002/0054089 A1* | 5/2002 | Nicholas | G06Q 30/02 715/745 |
| 2002/0062338 A1* | 5/2002 | McCurley | H04L 29/06 709/203 |
| 2002/0069122 A1* | 6/2002 | Yun | G06Q 30/06 705/26.1 |
| 2002/0078143 A1* | 6/2002 | De Boor | G06F 17/30884 709/203 |
| 2002/0156770 A1* | 10/2002 | Krichilsky | G06Q 30/02 |
| 2003/0050976 A1* | 3/2003 | Block | G06Q 10/10 709/203 |
| 2003/0158960 A1* | 8/2003 | Engberg | G06Q 20/02 709/237 |
| 2003/0167213 A1* | 9/2003 | Jammes | G06F 17/3089 705/26.62 |
| 2004/0098493 A1* | 5/2004 | Rees | G06F 21/6218 709/229 |
| 2004/0177047 A1* | 9/2004 | Graves | G06Q 20/02 705/71 |
| 2006/0190355 A1* | 8/2006 | Jammes | G06F 17/3089 705/27.1 |
| 2008/0040240 A1* | 2/2008 | Covington | G06Q 30/00 705/26.8 |
| 2009/0281914 A1* | 11/2009 | Tarvydas | G06Q 30/06 705/26.1 |
| 2010/0185556 A1* | 7/2010 | Kumar | G06F 17/30867 705/36 R |
| 2011/0087564 A1* | 4/2011 | Davis | G06Q 30/00 705/27.2 |
| 2012/0030065 A1* | 2/2012 | Tarvydas | G06Q 30/06 705/26.35 |
| 2012/0066362 A1* | 3/2012 | Sun | G06F 17/30876 709/223 |
| 2012/0323733 A1* | 12/2012 | Hernandez | G06Q 20/02 705/26.41 |

\* cited by examiner

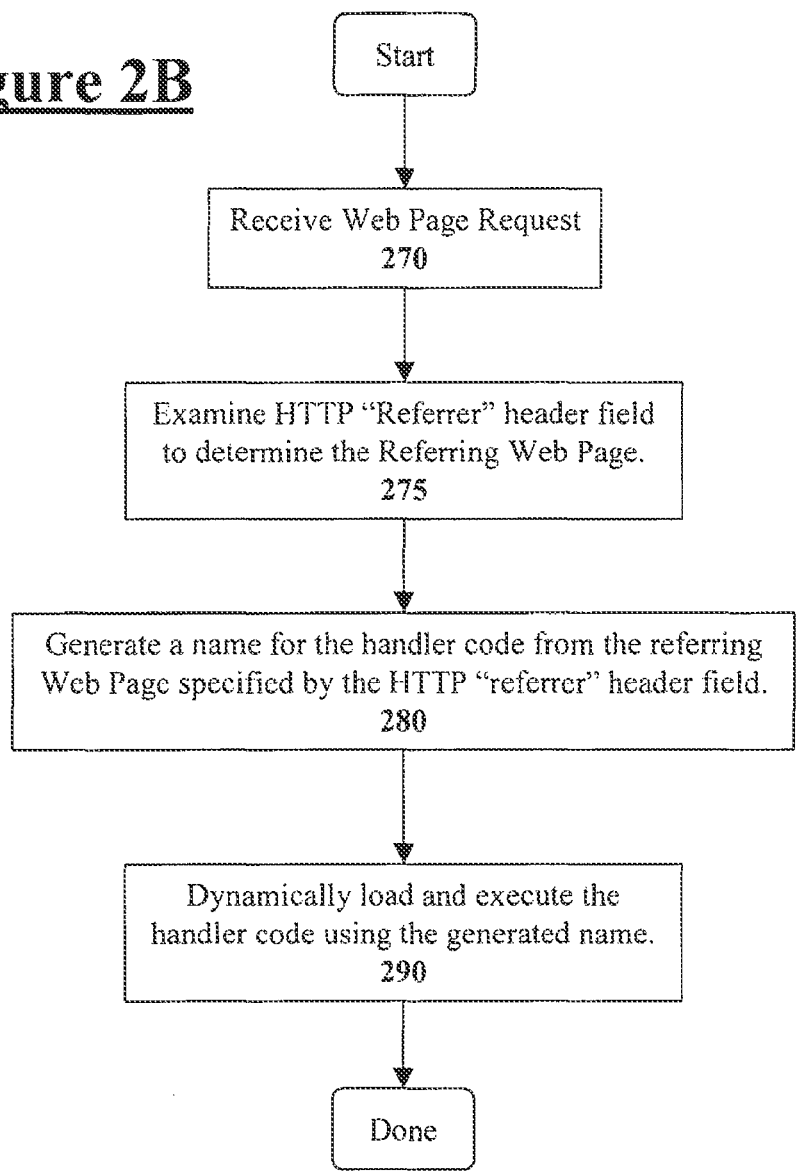

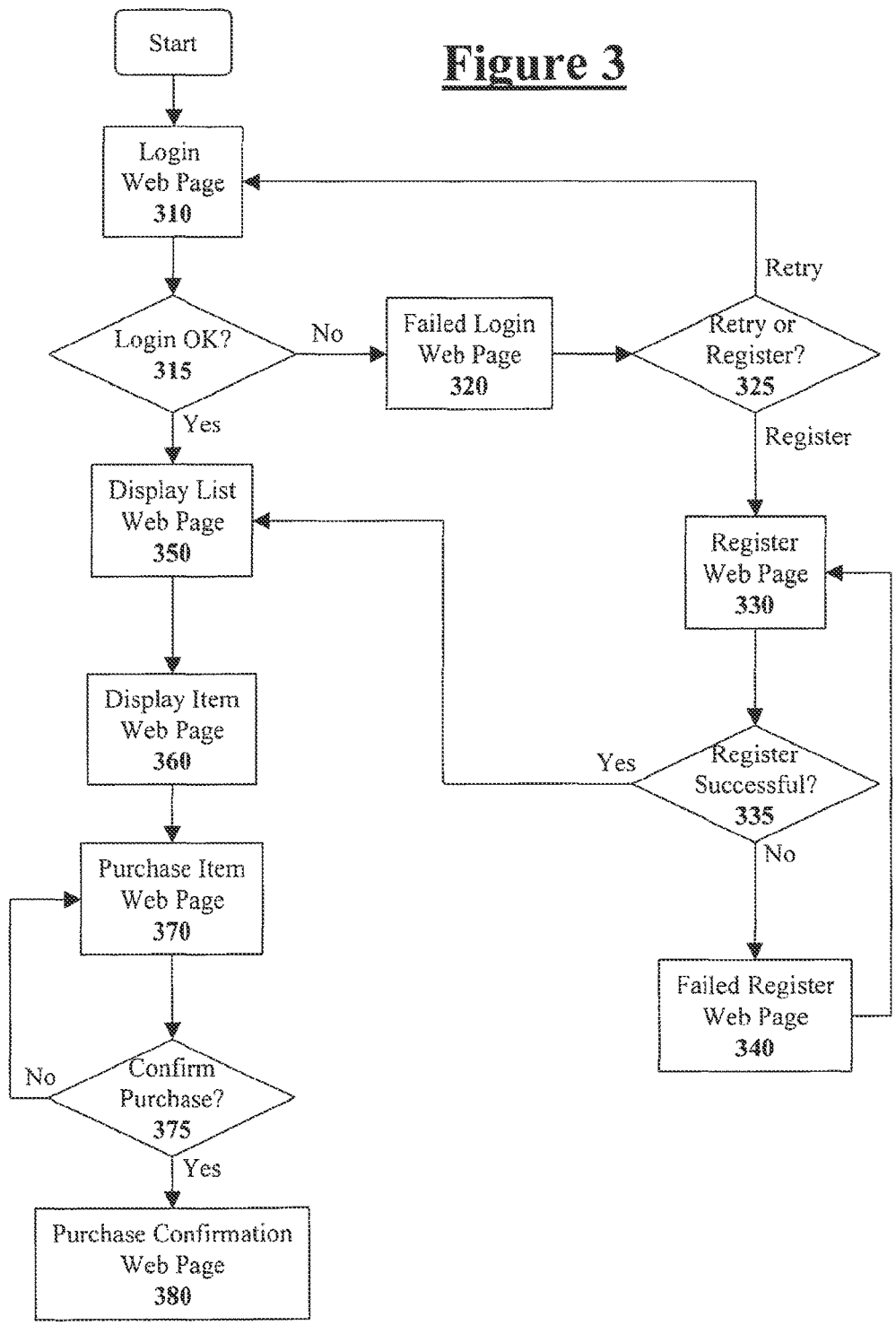

METHOD AND APPARATUS FOR PROCESSING INFORMATION RELATED TO INTERACTIVE WEB SITES

CROSS REFERENCE TO OTHER APPLICATIONS

This application is a continuation of co-pending U.S. patent application Ser. No. 09/693,797, entitled METHOD AND APPARATUS FOR PROCESSING INFORMATION RELATED TO INTERACTIVE WEB SITES filed Oct. 19, 2000 which is incorporated herein by reference for all purposes.

FIELD OF THE INVENTION

The present invention relates to the field of Internet communication. In particular the present invention discloses an arrangement and methods for processing information related to interactive web sites such as electronic commerce web sites.

BACKGROUND OF THE INVENTION

The Internet is a global interconnection of computer networks that share a common set of communication protocols. Most computers on the global Internet use the Transport Control Protocol layer and the Internet Protocol layer commonly referred to together as the TCP/IP standard protocols. By sharing a set of nonproprietary well-defined data communication protocols, the Internet allows almost any computer system to communicate with any other computer system.

The Internet and its predecessor, the ARPANET, has existed in some form since 1969. The Internet was mainly used by scientists and engineers until the late 1980s. In the late 1980's and early nineties when personal computer systems became powerful enough to handle networking, a wider audience of users began using the global Internet. Initially, most users used the Internet for electronic mail (email), file transfers, discussion groups, and email using the simple mail transport protocol (SMTP), the file transfer protocol (FTP), and the network news transport protocol (NNTP), respectively.

One particular transport protocol, known as the hypertext transport protocol (HTTP), was created for sharing hypertext markup language (HTML) documents. The creation of HTTP and HTML enabled Internet users to easily create media-rich documents that could easily be "browsed" using an HTML browser program. Each HTML document could refer to other HTML documents using hypertext links (hyperlinks). By linking together HTML documents located on various servers throughout the world using embedded hyperlinks, a "World Wide Web" (WWW) of interconnected hypertext documents was created. Due to the simple, yet very powerful nature of HTML and HTTP, the World Wide Web (WWW) portion of the Internet has grown into the most popular form of Internet communication.

The WWW portion of the Internet quickly became a new mass medium for information distribution. With the help of advertising support, millions of news and information web sites have been deployed on the global Internet.

The HTML and HTTP standards have been amended to handle two-way communication. Specifically, an HTTP server may present a user with an HTML "form" that can be filled-in by the user and sent back to a server. Using a processing system often known as Common Gateway Interface (CGI) script, the HTTP server may parse the returned HTML form to obtain the information entered by the person.

These interactive HTML and HTTP techniques have been used to create commercial WWW sites that can perform financial transactions. For example, a retailer may create a set of HTML documents that describe various products available for sale. The retailer may then provide HTML form documents that allow a user to specify a desired product, provide a shipping address, and provide a credit card to pay for the desired product. With such commerce based Internet web sites, the Internet has become the new frontier of commercial commerce.

Internet based commerce has been growing at an exponential rate. To provide highly automated web sites, Internet commerce vendors have gone far beyond the original static web pages. Most Internet commerce sites now dynamically create web sites to allow current promotions, personalized user information, and other dynamic information to be placed into web sites. Such complex dynamic web page design and implementation is nontrivial process. Once a dynamic web site has been created using a specific architecture, it is very difficult to change to a different architecture. Thus, it would be desirable to have better tools that would allow such complex web sites to be created and edited.

SUMMARY OF THE INVENTION

A method of developing interactive web sites that are easy to modify is disclosed. The method uses a specific web server request handler system that examines each request to determine if a handler should be called to handle information related to the referring web page. Specifically, for each web page, the server system examines the address of the referring web page to see if the server has a handler routine associated with the referring web page. If the server has a handler associated with the referring web page, then the server executes the handler routine to process any information in the current request, any state information, or any other information. After executing the handler routine, the server handles the current request, which is delivering the content of the current page. The handling of the current request may be affected by the processing performed by the handler routine associated with the referring web page. By associating the processing of current information with the previous web page, the system of the present invention decouples the links between the pages such that ordering of web pages may be changed without affecting the processing steps.

Other objects, features, and advantages of present invention will be apparent from the company drawings and from the following detailed description.

BRIEF DESCRIPTION OF THE DRAWINGS

The objects, features, and advantages of the present invention will be apparent to one skilled in the art, in view of the following detailed description in which:

FIG. 2B illustrates a flow diagram describing of how a second embodiment server system according to the teachings of the present invention handles client requests.

FIG. 3 illustrates a web site flow diagram for an example ecommerce site.

DETAILED DESCRIPTION OF THE PREFERRED EMBODIMENT

Methods and arrangements for creating interactive web sites that are easy to modify are disclosed. In the following description, for purposes of explanation, specific nomenclature is set forth to provide a thorough understanding of the present invention. However, it will be apparent to one skilled in the art that these specific details are not required in order to practice the present invention. For example, the present invention has been described with specific references to the HyperText Transport protocol (HTTP). However, the same techniques can easily be applied to other types of communication protocols.

Internet Commerce

Figure 1:
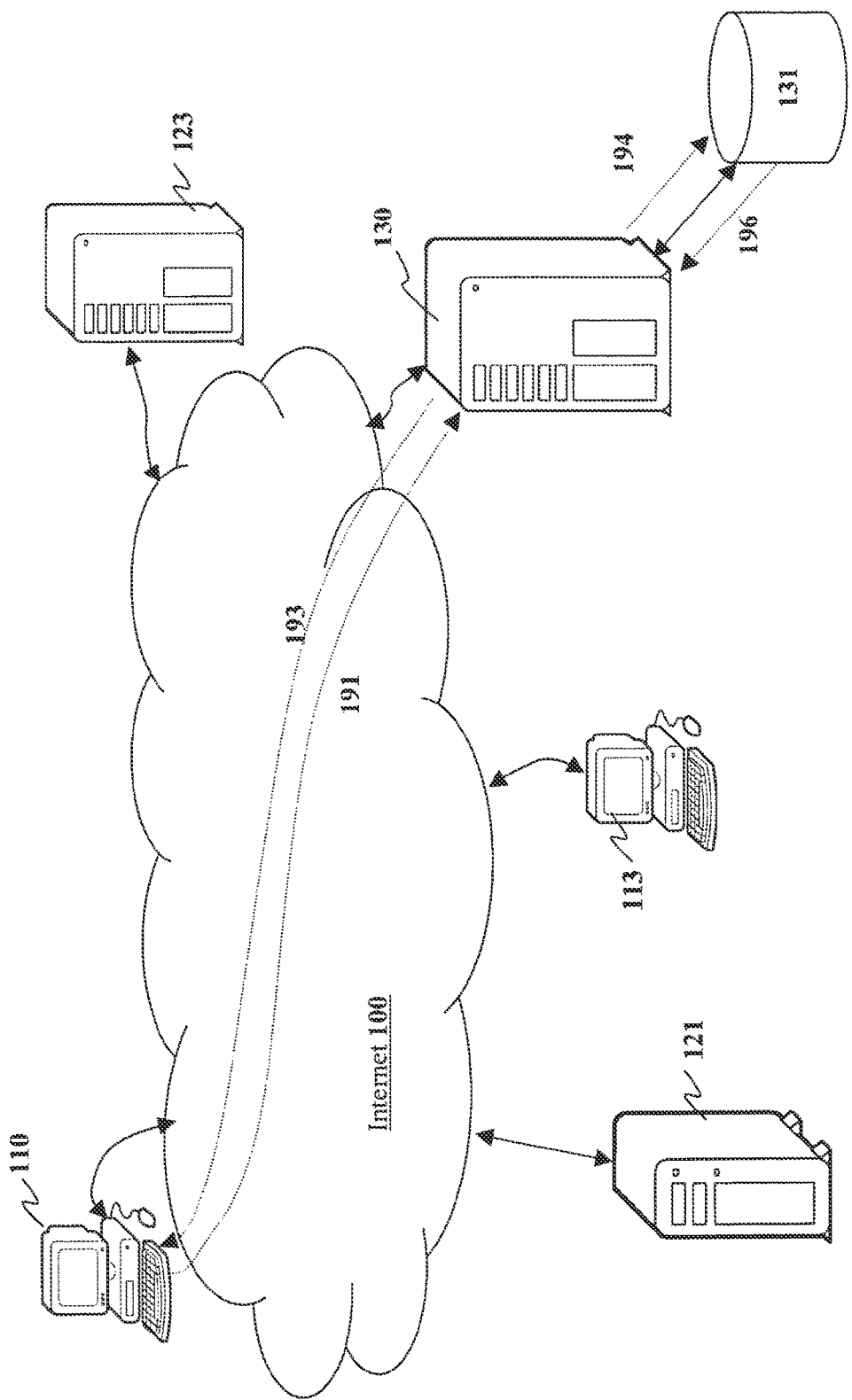
FIG. 1 illustrates a conceptual diagram of the Internet including several client systems and several server systems.

Internet based commerce, often known as ecommerce, has been one of the fastest growing industries in the late 1990's. FIG. 1 illustrates a conceptual diagram of a typical ecommerce system on the Internet 100. Referring to FIG. 1, there are a number of client computer systems such as personal computer 110 and 113 coupled to the Internet 100. The client computer systems typically use a web browser program such as Netscape's Navigator or Microsoft's Internet Explorer to access web sites on server systems such as web servers 121, 123, and 130.

In a normal web site browsing, a client computer system 110 requests information from an ecommerce server 130 along dataflow 191 using an HTTP "GET" request. The ecommerce server 130 responds to the "GET" request with information along dataflow 193.

To allow ecommerce transactions to take place, a web site must be made interactive. For example, to initiate an ecommerce transaction, client computer system 110 may need to request the purchase of a specific item from ecommerce server 130. One very common method of performing such an action is to issue an HTTP "POST" request from client system 110 to the ecommerce server 130 along dataflow 191. (However, it should be noted that an HTTP "GET" requests might also be used.) The "POST" request may contain information related to the desired purchase transaction such as a product item number, a consumer mailing address, and credit card information. The ecommerce site may then check an inventory and/or credit database 131 using the information contained in the "POST" request to determine if the purchase transaction should be approved. Originally, this was typically performed using a Common Gateway Interface (CGI) script to process the information in the "POST" request. Many current systems use technologies such as servlets, Java Server Pages (JSP), or Active Server Pages (ASP). After the processing, the ecommerce web site then informs the consumer if the consumer's transaction was approved by returning information along dataflow 193.

As Internet retailing has grown rapidly, almost every traditional retailer has been pressured to offer some type of Internet based commerce system in order to compete with a large contingent of upstart "Internet only" retailers. This heavy demand for ecommerce sites has created a shortage of skilled ecommerce site developers.

Since the demand for ecommerce sites continues to be strong, a number of software developers have been developing tools to speed the creation and deployment of ecommerce systems. These ecommerce development tools allow skilled developers to create complex ecommerce systems that integrate ecommerce web sites with inventory databases and accounting systems. However, the complex ecommerce web sites and back-end programs developed by these ecommerce development systems are difficult to modify. To keep their web sites "fresh" ecommerce retailers need to periodically change the structure of their ecommerce web sites. With most existing ecommerce development tools, this can be a very difficult and expensive proposition.

Interactive Web Pages with Associated Handler Routines

To create a web site development system that allows the structure of the web site to be easily modified, the present invention introduces a system that uses web pages having associated handler routines for creating interactive web sites. Specifically, each web page may be associated with specific "handler routine" for that web page. (Pages that do not need an associated handler routine will not have an associated handler routine.) The associated handler routine is called to perform processing associated with a particular web page after a user has finished with that particular web page and moved onto another web page. By associating each individual web page with an associated handler routine and calling the associated handler routine after each web page has been viewed, the present invention creates an intuitively structured web site. With the system of the present invention, an interactive web site designer can change the order that the web pages are presented by simply changing the various links between the web pages. The interactive web site will continue to operate since each handler routine continues to be associated with it's designated web page.

Associated Handler Routine Details

In one embodiment, the associated handler routine comprises a Java Class that is executed on an application server after a user has examined a particular web page and performed a "Submit" on that particular web page. For example, a user may perform a Submit by selecting a hyperlink on that particular web page. The associated handler routine processes any information that may be made available to it including information in a client's "POST" request, information in a client's "GET" request, server maintained state information, and information from a "cookie" stored on the client system. The results of the handler routine may be used to control the next web page sent to the client system or specify specific information sent in that web page.

Figure 2A:
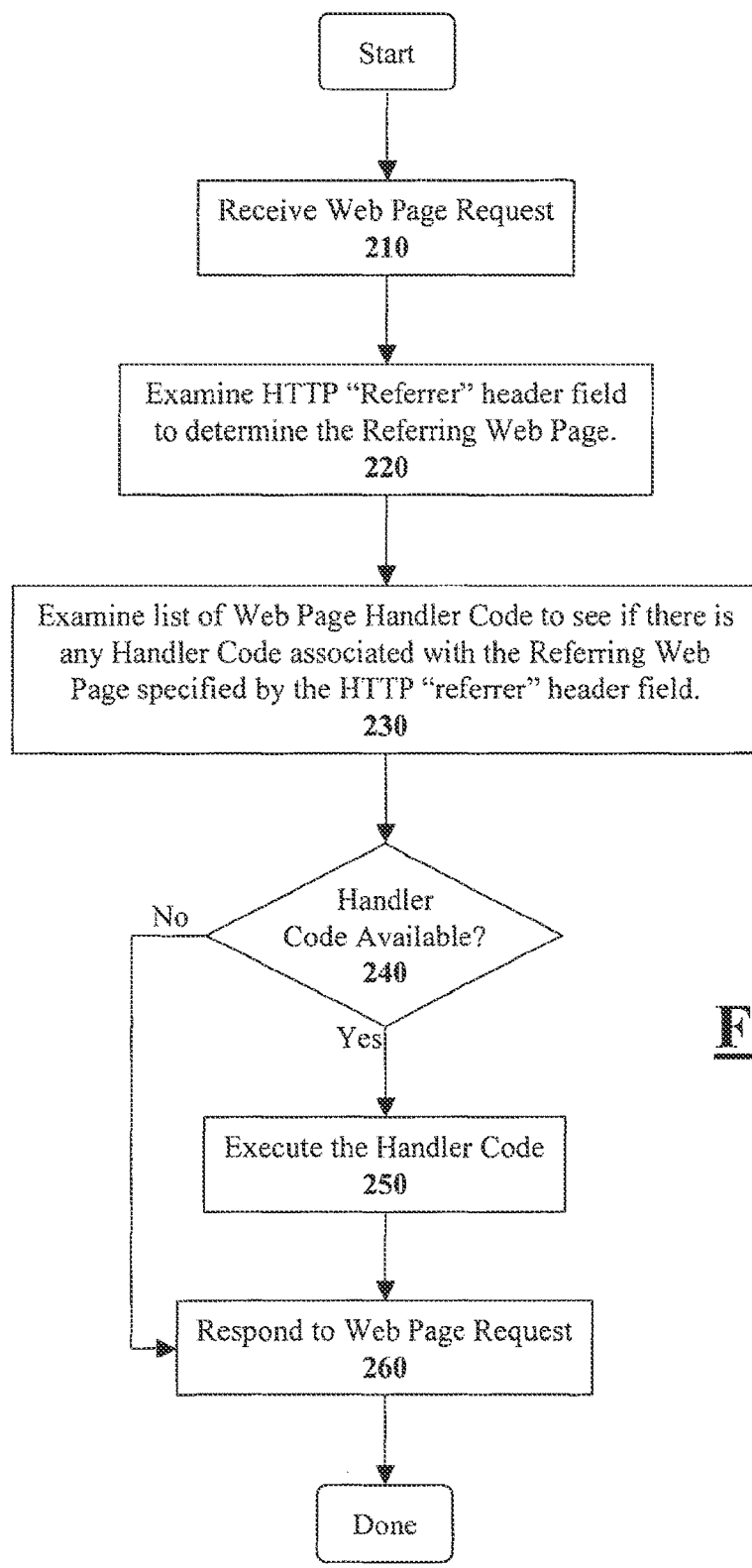
FIG. 2A illustrates a flow diagram describing of how a first embodiment server system according to the teachings of the present invention handles client requests.

The associated handler routine may be associated to a web page using some type of directory that associates web page addresses with specific handler routines. For example, the full (or a subset of the) Uniform Resource Locator (URL) of a particular web page may be placed into a list along with some type of reference to an associated handler routine for that particular web page. In one embodiment, the reference may be the name of a Java class that implements a certain pre-defined Java interface. In this manner, when a web server constructed using the teachings of the present invention receives a request, the web server will compare the URL of the referring (previous) web page with that list of URLs and references to Handler routines. If the web server locates a match, then the server will execute the associated handler routine that was located. The server may execute the associated handler routine by dynamically loading a named Java class. FIG. 2A illustrates a flow diagram that describes how one embodiment of the system may operate.

Referring to the first embodiment of the present invention illustrated in FIG. 2A, a web server constructed according to the teachings of the present invention receives some type of request at step 210. The request may be an HTTP "GET", "POST", or any other type of request. Next, at step 220, the system examines a referrer field in the request to determine the address of a referring web page. The referrer field may be a "Referrer" header in an HTTP formatted request.

After obtaining an address of a referring web page, the system then looks for a handler associated with the referrer address in step 230. In one embodiment, the system may locate an associated handler searching a list of web page addresses and associated references to handler routines. To optimize the associated handler routine search, the list may be hashed using the web page address as a hash key.

At step 240, the system tests to see if any associated handler has been found. If no handler has been found, then the system simply responds to the request at step 260. If a handler was found, then the system calls the handler routine at step 250. The handler routine may process information contained in the request and other state information. After processing the handler routine at step 250, the system responds to the request at step 260. Note that the handler routine processing may slightly affect how the system responds to the client in step 260. Some handler routines will have no effect, some handler routines will affect the data delivered to the client, and some handler routines may redirect the client to another web page entirely.

FIG. 2B illustrates a second method of implementing the associated handler routine system of the present invention. Referring to the embodiment of FIG. 2B, a web server receives a request at step 270. The request may be an HTTP "GET", "POST", or any other type of request. Next, at step 275, the system examines the referrer field in the HTTP request to determine the address of a referring web page.

After obtaining the address of a referring web page, the system then generates a name for a handler associated with the referrer address in step 280. The name of the handler may be the same as the address or a slightly modified version with some illegal characters removed. Finally, at step 290, the system attempts to dynamically load and execute (using Java) handler code for the referring web page using the generated handler code name. If there is no associated handler code for that particular web page, then the dynamic loading will fail and normal processing will resume. Thus, in such an embodiment there is no need to maintain a list of handler routines.

In yet another embodiment, the hyperlinks in the referring page contain the name of the handler routine as a parameter to the linked page. For example, the following hyperlink can be used to call the handler routine "myHandlerClass":

http://www.abc.com/page5.html?handler=MyHandlerClass

In such an embodiment, the web server examines the parameter field for a "handler" attribute and executes the named handler if such a handler attribute is specified. Thus, the above hyperlink will cause the web server to execute a handler routine called "MyHandlerClass" before delivering the web page "http://www.abc.com/page5.html". As set forth in the previously described embodiments, the handler routine may be executed by dynamically loading the named handler routine.

To best illustrate how the system of the present invention provides advantages over the prior art systems, an example of ecommerce web site is presented. The example of the ecommerce site will then be simply modified into a different interactive web site.

Membership Required Ecommerce Site Example

FIG. 3 illustrates a flow diagram that describes the general flow of how one particular ecommerce site may operate. The example ecommerce site of FIG. 3 is a site that requires each shopper to be a member of the web site. It should be noted that the example of FIG. 3 is just a simplistic example provided to illustrate how the teachings of the present invention operate. Much more complex interactive web sites may be built using the teachings of the present invention.

Referring to FIG. 3, a "home" page 310 (this document refers to the home page as the first page that a user accesses when visiting a particular web site) of the members-only ecommerce web site is a "login" page the requests a member to log into the ecommerce web site. A user may login into the ecommerce web site by providing a membership name and a password. In a typical embodiment, the login page will be a "form" that can be filled in by the user posted back to the server using the HTTP "POST" request. Next, at step 315, the ecommerce server authenticates the login. If the login fails, the user is next presented with a failed login page 320. The user may specify if he wishes to retry the login (and thus return to login page 310) or register as a new user. Computer code, such as Java servlets, CGI code, Java Server Pages, or Active Server Pages, at step 325 may handle the user's response. If the user decides to register with the ecommerce web site, then the system presents the user with a register page at step 330. The user may then enter required registration information. The registration information is processed at step 335. If the processing of the user registration information fails, the user is presented with a failed registration page 340. The user may attempt to reregister by returning to page 330.

If the registration succeeded at step 335 (or a member logged in successfully back at step 315), then the interactive members-only ecommerce web site presents a list of products available at page 350. The user may select an individual item to examine such that the web site moves the user to individual item display page 360. (Note that the system may present many different items and only a single item is listed to keep the example simple.) If the user elects to purchase the item on item display page 360, the user is presented with a purchase item page 370 that allows the user to confirm the purchase of the item. CGI code at step 375 verifies if the user confirmed the item purchase and presents a purchase confirmation page 380 if the user confirmed the purchase.

Membership Required Ecommerce Site Example

Figure 4:
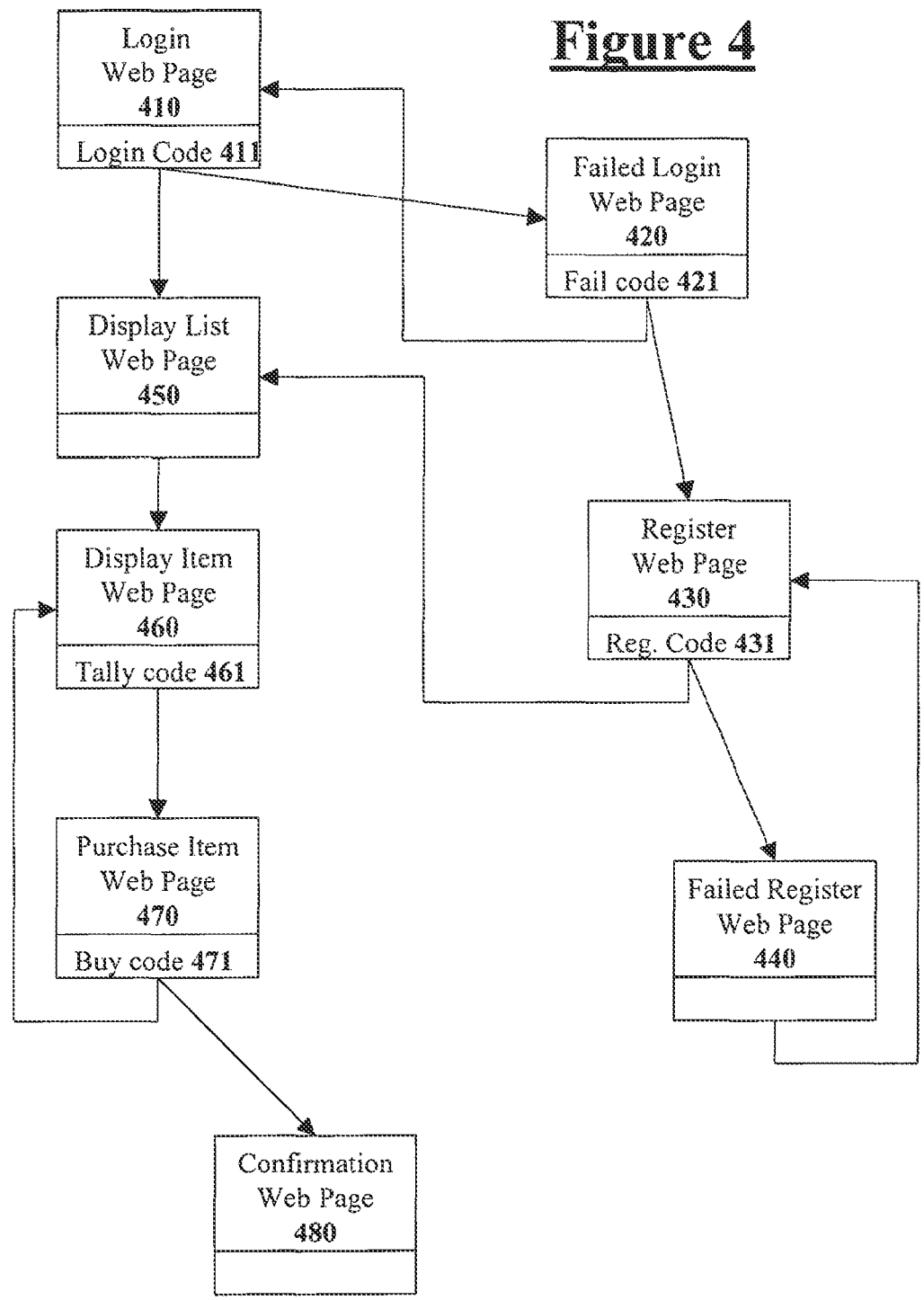
FIG. 4 illustrates a web page and handler routine flow diagram for the web site flow diagram of FIG. 3.

To convert the desired ecommerce web site, each web page is associated with a handler routine that handles any response information from the user, state information, cookie information, or any other available information. After each web page is viewed and a successive request is received, the web site server system calls a handler routine associated with the previous web page (the referring web page) as set forth in the flow diagram of FIG. 2. To conceptually illustrate the system, FIG. 4 illustrates the example web site flow of FIG. 3 using web pages and associate handler programs. Referring to FIG. 4, each web site is illustrated as a rectangle along with a smaller appended rectangle that represents the associated handler routine. For example login web page 410 has associated login handler routine code 411.

Referring to FIG. 4, the user is first presented with a login page 410 as the home page. At the login page 410, the user enters login information such as his member name and password. After entering the information, the user selects an enter button that causes his local browser to send a request to the server. Upon receiving the request, the server performs the steps outlined in FIG. 2. Specifically, the server looks at the referring address (the address of the login page) contained within the HTTP request header and locates a handler routine associated with that referring web page. The server then executes that handler routine to process the login data. Thus, the login code 411 (the associated handler routine) is located by the server and executed.

The login code 411 processes the login information. In this case, the results of the processing will affect how the server will respond to the request. If the login code 411 detects proper login, the server will return the display list web page 450. However, if the login code detects a login failure, the server will present the user with failed login web page 420. The failed login page 420 will present the user with an option to retry the login or register as a new user. After the user selects one of those options in a server request, the server will again perform the steps in FIG. 2 to process any information from the failed login page 420. Thus, the server will locate and execute the fail code 421 associated with the failed login page 420. That fail code will determine if the server will respond with the login web page 410 (if the user selected retry) or the register web page 430 (if the user selected register as new user).

Note that not all of the web pages will have associated handler routines. For example display list web page 450 that displays a list of items available for purchase may not have any associated handler code. The display list web page 450 may merely contain a list of links to specific product pages. When a user selects a particular product from the display list web page 450 the server may fail to locate an associated handler routine. Thus, the server will not execute any handler code and just serve the requested web page associated with the selected product.

Editing the Site Flow Structure

As previously set forth, the associated handler routine structure of the present invention allows interactive web sites to be modified more easily than custom built interactive web sites. To illustrate this advantage, an example modification to the membership-only ecommerce site of FIGS. 3 and 4 will be presented.

Figure 5:
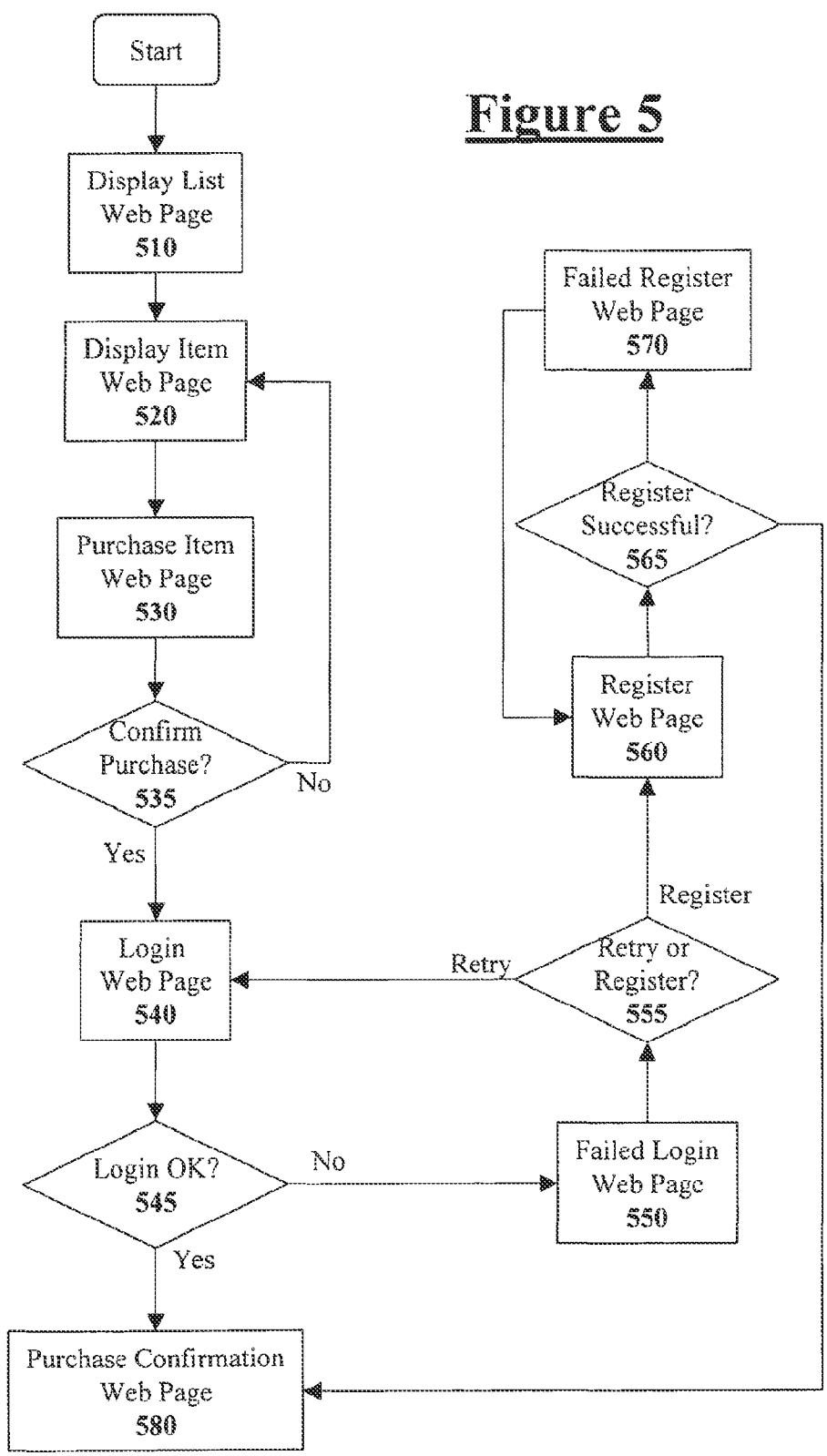
FIG. 5 illustrates a modified web site flow diagram for modified version of the example ecommerce site presented in FIG. 3.

FIG. 5 illustrates a web site flow diagram that is a different version of the web site illustrated in FIG. 3. Referring to FIG. 5, a consumer that access the site is first presented with a display list web page 510 that lists a set of products that may be purchased. Any user on the Internet can browse the list to select and view individual items. When a user selects an item, the server will display a display item web page 520. If the user is interested in purchasing the item, the user may select a "buy" button such that the system tallies a total for the purchase and displays a purchase item web page 530. At this point, the user may confirm the purchase.

If the user confirms the purchase, then the user is presented with a login web page 540. Thus, in the member-only ecommerce web site of FIG. 5, any person can browse the products but when they wish to buy, they must login. After a user enters login information, the web site executes code that examines the login at step 545. If the user logged in correctly, then the system displays a purchase confirmation page 580. If the user does not login correctly, the system displays a failed login web page 550 that allows the user to retry the login or register with the ecommerce site. If the user elects to retry, then web site code at step 555 returns the user to the login web page 540. If the user elects to register, the web site code at step 555 directs the user to a registration page 560.

Figure 6:
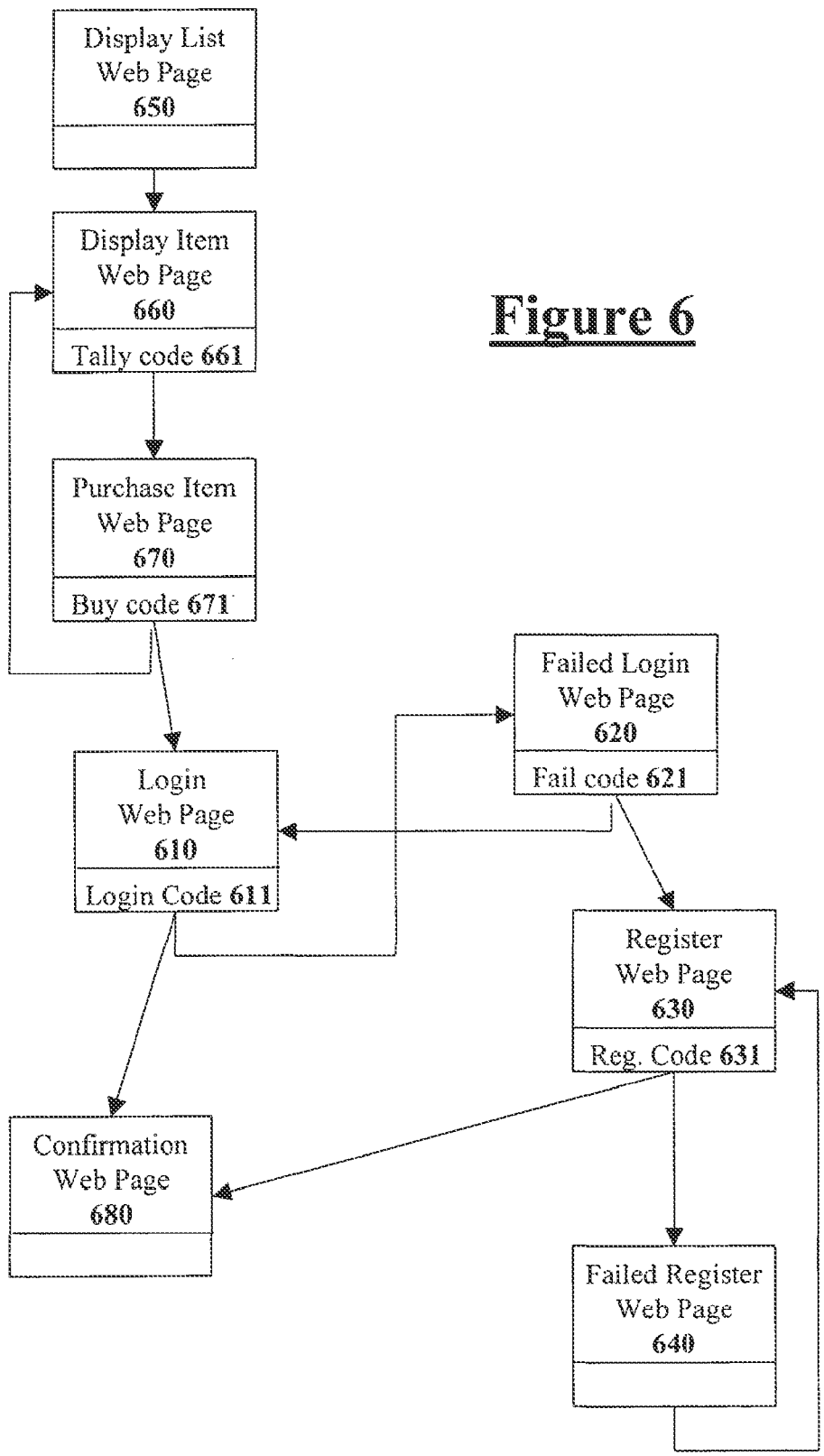
FIG. 6 illustrates a web page and handler routine flow diagram for the web site flow diagram of FIG. 5.

With system of the present invention wherein web pages have associated handler routines, the web system of FIG. 4 can quickly be changed to operate in the manner described in FIG. 5. FIG. 6 illustrates how the same web site elements of FIG. 4 can be rearranged to create the desired web site flow of FIG. 5. It should be noted that the rearrangement only requires changing the hyperlinks in the HTML pages and that no recoding of the Java code is necessary.

Referring to FIG. 6, the Display list web page 650 has been moved to become the new "home" page. Following the Display list web page 650 is the display item page 660. If the user elects to purchase an item, the purchase item page 670 is displayed next. If the user confirms a purchase, the buy code 671 now directs the user to the login page 610 instead of the confirmation. The login web page 610 requires the user to login with his membership information. The login code 611 tests the login information and if the login information was authenticated, the login code 611 displays the confirmation web page 680. Thus, the login code 611 was changed to move the user to the confirmation page 680 after a successful login. If the login is unsuccessful, the login code 611 displays the failed login page 620.

It can be seen from FIG. 6, that a completely different web site can be create by simply adjust the links between the various web pages and handler routines from FIG. 4. To create a very simple system, a graphical user interface may be used. The graphical user interface (GUI) may display the various web pages and handler routines as shown in FIGS. 4 and 6. When a user changes a link between web pages, the code behind the GUI will alter the web page or handler routine as appropriate to effectuate the change. For example, when a user changes the link from a successful login result from the display list web page 450 (as shown in FIG. 4) to the sale confirmation web page 680, the editor program simply changes the success link in the login code as appropriate.

The foregoing has described methods for creating interactive web sites that are easy to modify. It is contemplated that changes and modifications may be made by one of ordinary skill in the art, to the materials and arrangements of elements of the present invention without departing from the scope of the invention.

What is claimed is:

1. A system, comprising:
   a set of one or more interfaces configured to receive a request from a client, wherein the request specifies an address of a referring web page;
   a set of one or more processors configured to:
   determine, based at least in part on a previously defined mapping that associated web page addresses with handler routines, whether a handler routine associated with the address of the referring web page specified in the received request is available;
   in an event that a handler routine associated with the address of the referring web page specified in the received request is determined to be available:
   execute the handler routine, wherein the handler routine, when executed, processes information associated with the request received from the client; and
   respond to the request received from the client; and in the event that a handler routine associated with the address of the referring web page specified in the received request is determined to be not available, respond to the request received from the client, wherein an order of a plurality of referring web pages and subsequent web pages presented to the client are selectively changeable using handler routines associated with the addresses of the referring web pages; and a memory coupled to the processor and configured to provide the processor with instructions.

2. The system of claim 1 wherein the request comprises an HTTP "POST" request.

3. The system of claim 1, wherein receiving the request comprises receiving information identified by a cookie associated with the client.

4. The system of claim 1, wherein the request comprises an HTTP "GET" request.

5. The system of claim 1, wherein the handler routine comprises a Java Class.

6. The system of claim 1, wherein the previously defined mapping comprises a directory of web page addresses and associated handler routines.

7. The system of claim 1, wherein the address of the referring web page comprises a Uniform Resource Locator.

8. The system of claim 1, wherein the previously defined mapping comprises a list of web page addresses and associated handler routines, and wherein the list comprises a hashed list.

9. The system of claim 1, wherein the address of the referring web page is derived at least in part by examining a referrer field in a HTTP request header.

10. The system of claim 1, wherein executing the handler routine comprises dynamically loading the handler routine.

11. A method, comprising:
receiving, via a set of one or more interfaces, a request from a client, wherein the request specifies an address of a referring web page;
determining, using a set of one or more processors, and based at least in part on a previously defined mapping that associated web page addresses with handler routines, whether a handler routine associated with the address of the referring web page specified in the received request is available;
in an event that a handler routine associated with the address of the referring web page specified in the received request is determined to be available:
executing, using the set of one or more processors, the handler routine, wherein the handler routine, when executed, processes information associated with the request received from the client; and
responding, using the set of one or more processors, to the request received from the client; and
in the event that a handler routine associated with the address of the referring web page specified in the received request is determined to be not available, responding, using the set of one or more processors, to the request received from the client, wherein an order of a plurality of referring web pages and subsequent web pages presented to the client are selectively changeable using handler routines associated with the addresses of the referring web pages.

12. The method of claim 11 wherein the request comprises an HTTP "POST" request.

13. The method of claim 11, wherein receiving the request comprises receiving information identified by a cookie associated with the client.

14. The method of claim 11, wherein the request comprises an HTTP "GET" request.

15. The method of claim 11, wherein the handler routine comprises a Java Class.

16. The method of claim 11, wherein the previously defined mapping comprises a directory of web page addresses and associated handler routines.

17. The method of claim 11, wherein the address of the referring web page comprises a Uniform Resource Locator.

18. The method of claim 11, wherein the previously defined mapping comprises a list of web page addresses and associated handler routines, and wherein the list comprises a hashed list.

19. The method of claim 11, wherein the address of the referring web page is derived at least in part by examining a referrer field in a HTTP request header.

20. The method of claim 11, wherein executing the handler routine comprises dynamically loading the handler routine.

21. A computer program product, the computer program product being embodied in a non-transitory computer readable storage medium and comprising constructions for:
receiving, via a set of one or more interfaces, a request from a client, wherein the request specifies an address of a referring web page;
determining, using a set of one or more processors, and based at least in part on a previously defined mapping that associated web page addresses with handler routines, whether a handler routine associated with the address of the referring web page specified in the received request is available;
in an event that a handler routine associated with the address of the referring web page specified in the received request is determined to be available:
executing, using the set of one or more processors, the handler routine, wherein the handler routine, when executed, processes information associated with the request received from the client; and
responding, using the set of one or more processors, to the request received from the client; and
in the event that a handler routine associated with the address of the referring web page specified in the received request is determined to be not available, responding, using the set of one or more processors, to the request received from the client,
wherein an order of a plurality of referring web pages and subsequent web pages presented to the client are selectively changeable using handler routines associated with the addresses of the referring web pages.

* * * * *